United States Patent
Nagashima et al.

(10) Patent No.: US 10,926,649 B2
(45) Date of Patent: Feb. 23, 2021

(54) METHOD TO REDUCE LOSSES IN A HIGH VOLTAGE DC LINK CONVERTER

(71) Applicant: Flex Power Control, Inc., Woodland Hills, CA (US)

(72) Inventors: James Michio Nagashima, Cerritos, CA (US); Gregory Scott Smith, Woodland Hills, CA (US)

(73) Assignee: Flex Power Control, Inc., Woodland Hills, CA (US)

( * ) Notice: Subject to any disclaimer, the term of this patent is extended or adjusted under 35 U.S.C. 154(b) by 0 days.

(21) Appl. No.: 14/975,693

(22) Filed: Dec. 18, 2015

(65) Prior Publication Data

US 2016/0181933 A1    Jun. 23, 2016

Related U.S. Application Data

(60) Provisional application No. 62/095,204, filed on Dec. 22, 2014, provisional application No. 62/095,396, (Continued)

(51) Int. Cl.
*H02M 3/335* (2006.01)
*B60L 53/10* (2019.01)
(Continued)

(52) U.S. Cl.
CPC ............... *B60L 53/11* (2019.02); *B60L 53/22* (2019.02); *B60L 53/51* (2019.02); *B60L 53/53* (2019.02);
(Continued)

(58) Field of Classification Search
CPC .......... H02M 3/22; H02M 3/28; H02M 3/285; H02M 3/325; H02M 3/335;
(Continued)

(56) References Cited

U.S. PATENT DOCUMENTS 5,825,639 A * 10/1998 Wagoner ................... H02J 1/02
                                                          363/39
7,764,527 B2 * 7/2010 Takayanagi ........... H02M 7/797
                                                          323/267
(Continued)

*Primary Examiner* — Thienvu V Tran
*Assistant Examiner* — Carlos O Rivera-Perez
(74) *Attorney, Agent, or Firm* — Smyrski Law Group, a P.C.

(57) ABSTRACT

A multiple stage switching type converter circuit provided between an AC source and a DC source is provided. The circuit includes a boost converter stage coupled to the AC source, a DC link capacitor stage comprising a DC link capacitor decoupled from an AC source and a DC source, and an isolated DC-DC converter stage coupled to the DC source. The multiple stage switching type converter circuit comprises a plurality of switches, each switch configured to operate at a baseline duty cycle, a baseline voltage, a baseline resistance, with a baseline current and providing a baseline switching time. At least one switch is altered to perform at a duty cycle differing from the baseline duty cycle, a voltage differing from the baseline voltage, a resistance differing from baseline resistance, with a current differing from the baseline current or using a switching time differing from the baseline switching time.

22 Claims, 6 Drawing Sheets

Related U.S. Application Data filed on Dec. 22, 2014, provisional application No. 62/095,432, filed on Dec. 22, 2014.

(51) Int. Cl.
| | | |
|---|---|---|
| *H02J 3/38* | (2006.01) | |
| *H02J 3/14* | (2006.01) | |
| *B60L 53/22* | (2019.01) | |
| *B60L 55/00* | (2019.01) | |
| *B60L 53/51* | (2019.01) | |
| *B60L 53/53* | (2019.01) | |
| *H02M 7/219* | (2006.01) | |
| *H02M 7/5387* | (2007.01) | |
| *H02J 3/32* | (2006.01) | |

(52) U.S. Cl.
CPC ............... *B60L 55/00* (2019.02); *H02J 3/14* (2013.01); *H02J 3/383* (2013.01); *H02M 3/33584* (2013.01); *H02M 7/219* (2013.01); *H02M 7/5387* (2013.01); *H02J 3/32* (2013.01); *H02J 3/385* (2013.01); *H02J 2310/14* (2020.01); *Y02B 70/3225* (2013.01); *Y02E 10/56* (2013.01); *Y02E 60/00* (2013.01); *Y02T 10/70* (2013.01); *Y02T 10/7072* (2013.01); *Y02T 10/92* (2013.01); *Y02T 90/12* (2013.01); *Y02T 90/14* (2013.01); *Y04S 10/126* (2013.01); *Y04S 20/222* (2013.01)

(58) Field of Classification Search
CPC ......... H02M 3/33507; H02M 3/33515; H02M 3/33523; H02M 3/3353; H02M 3/33569; H02M 3/33576; H02M 3/33584; H02M 3/335692; H02M 7/219; H02M 7/5387; H02M 7/68; H02M 7/797; H02M 7/757; H02M 7/7575; H02M 5/40; H02M 5/42; H02M 5/44; H02M 5/453; H02M 5/458; H02M 5/4585; H02M 1/4216; H02M 1/42; H02M 1/4208; H02M 1/4233; H02M 1/4241; H02M 1/425; H02M 1/4258; H02M 2001/0048; H02M 2001/0051; H02M 2001/0054; H02M 2001/0058; H02M 3/3356; Y02E 60/60; Y02E 10/563; Y02E 10/566; Y02E 10/58; Y02E 60/721; Y02E 10/56; Y02E 60/00; H02J 3/383; H02J 3/36; H02J 3/38; H02J 3/381; H02J 3/382; H02J 3/386; H02J 3/14; H02J 3/32; H02J 3/385; H02J 2003/143; H02J 2310/00; H02J 2310/10; H02J 2310/12; H02J 2310/14; B60L 11/1816; B60L 55/00; B60L 53/22; B60L 53/51; B60L 53/53; B60L 53/11; B60L 53/14; B60L 53/30; B60L 2210/00–46; Y02B 70/3225; Y04S 20/222; Y04S 10/126; Y02T 10/7005; Y02T 10/7088; Y02T 10/92; Y02T 90/121; Y02T 90/127; Y02T 90/128; Y02T 90/14; Y02T 10/70; Y02T 10/7072; Y02T 90/12
USPC .... 363/15–21.03, 34, 35, 37, 38, 40–48, 65, 363/74, 79, 81, 89, 95–99, 131–134; 323/205–211, 266, 271–275, 282–288, 323/351, 906; 320/137, 139–146
See application file for complete search history.

(56) References Cited

U.S. PATENT DOCUMENTS

| | | | | |
|---|---|---|---|---|
| 8,780,592 | B1* | 7/2014 | Jones | H02J 3/383 |
| | | | | 363/39 |
| 9,912,247 | B2* | 3/2018 | Chung | H02M 5/458 |
| 2003/0218887 | A1* | 11/2003 | Kojori | H02P 23/0004 |
| | | | | 363/16 |
| 2012/0257429 | A1* | 10/2012 | Dong | H02M 3/1582 |
| | | | | 363/127 |
| 2012/0327602 | A1* | 12/2012 | Kulkarni | H02M 7/003 |
| | | | | 361/700 |
| 2013/0057200 | A1* | 3/2013 | Potts | H02M 3/33584 |
| | | | | 320/107 |
| 2013/0094261 | A1* | 4/2013 | Kern | H02J 3/383 |
| | | | | 363/98 |
| 2014/0347896 | A1* | 11/2014 | Chung | H02M 1/143 |
| | | | | 363/34 |
| 2016/0065079 | A1* | 3/2016 | Bai | H02J 5/005 |
| | | | | 363/21.01 |
| 2016/0181944 | A1* | 6/2016 | James | B60L 11/1816 |
| | | | | 363/17 |

* cited by examiner

METHOD TO REDUCE LOSSES IN A HIGH VOLTAGE DC LINK CONVERTER

This application claims priority based on:

U.S. Provisional Patent Application Ser. No. 62/095,204, inventors James Nagashima et al., entitled "Multi-Functional Power Management System," filed Dec. 22, 2014;

U.S. Provisional Patent Application Ser. No. 62/095,396, inventors James Nagashima et al., entitled "Highly Reliable AC-DC Power Converter with High Voltage DC Link," filed Dec. 22, 2014, and U.S. Provisional Patent Application Ser. No. 62/095,432, inventors James Nagashima et al., entitled "Method to Reduce Losses in a High Voltage DC Link Converter," filed Dec. 22, 2014, and the present application is being filed concurrently with:

U.S. patent application Ser. No. 14/975,677, inventors James Nagashima et al., entitled "Reliable AC-DC Power Converter with High Voltage DC Link," and U.S. patent application Ser. No. 14/975,701, inventors James Nagashima et al., entitled "Multi-Functional Power Management System,"

the entirety of all of which are incorporated herein by reference.

BACKGROUND OF THE INVENTION

1. Field of the Invention

The present invention relates generally to high voltage Direct Current (DC) link power converters, and more specifically to reducing switching losses and improving efficiency of these types of converters.

2. Description of the Related Art

In most of today's electronic power converters, energy storage is required. This is especially true in single phase Alternating Current (AC) to Direct Current (DC) power converters, or rectifiers. In single phase AC systems the line voltage varies sinusoidally from a maximum value to zero at the line frequency. At zero voltage power cannot be generated, while at low voltages very little power generation is available. An energy storage mechanism enables the output to be held during these changes in supplied line voltage.

In modern power converters a power factor close to unity is generally required, resulting in nearly pure resistive loads. Power factor is defined as either the ratio of real power to apparent power (real plus reactive power), or for sinusoidal waveforms, Cosine($\theta$), the phase angle between the voltage and current. As a result, power delivered varies at the line frequency on the AC side of the converter.

On the DC side, power is normally constant with most applications such as a PV (photovoltaic) panels or battery charger. In order to transform constant power into variable AC power some form of energy storage is needed. In conventional single phase converters, a bank of capacitors is provided to store energy when excess power is available and supply energy, or source, when needed.

In general, electrolytic capacitors are chosen for energy storage since electrolytic capacitors have a high capacitance-to-volume ratio and are good for line frequency applications. However, these capacitors are bulky and have a limited life. Increasing the DC voltage can decrease the capacitance value needed as the square of the voltage increase for a certain power level. Often, this can result in a significant reduction in capacitance that permits the use of metalized film capacitors which can operate at much higher voltages with increase lifetimes and lower losses. However, operating at a fixed DC voltage can result in higher device switching losses due to the higher voltages applied. This can result in lower converter efficiency.

It would therefore be advantageous to provide a system that overcomes known component lifetime limitations in former power circuit designs while improving overall system reliability.

SUMMARY OF THE INVENTION

According to one aspect of the present design, there is provided a multiple stage switching type converter circuit provided between an AC source and a DC source. The circuit comprises a boost converter stage coupled to the AC source, a DC link capacitor stage comprising a DC link capacitor decoupled from an AC source and a DC source, and an isolated DC-DC converter stage coupled to the DC source. The multiple stage switching type converter circuit comprises a plurality of switches, each switch configured to operate at a baseline duty cycle, a baseline voltage, a baseline resistance, with a baseline current and providing a baseline switching time. At least one switch is altered to perform at a duty cycle differing from the baseline duty cycle, a voltage differing from the baseline voltage, a resistance differing from baseline resistance, with a current differing from the baseline current or using a switching time differing from the baseline switching time.

According to another aspect of the present design, there is provided an AC to DC converter system, comprising a single phase AC energy source, a DC energy source, a bi-directional AC to DC boost converter circuit coupled to the single phase AC energy source, and a high voltage intermediate DC link circuit coupled to the bi-directional AC to DC Boost Converter and comprising at least one capacitor. The AC to DC converter system comprises a plurality of switches, each switch configured to operate at a baseline duty cycle, a baseline voltage, a baseline resistance, with a baseline current and providing a baseline switching time. At least one switch is altered to perform at a duty cycle differing from the baseline duty cycle, a voltage differing from the baseline voltage, a resistance differing from baseline resistance, with a current differing from the baseline current or using a switching time differing from the baseline switching time.

According to a further aspect of the present design, there is provided an AC to DC converter system comprising an AC input and a DC input, a bidirectional boost converter circuit coupled to the AC input, a high voltage DC link capacitor circuit coupled to the bidirectional boost converter and comprising multiple capacitors connected in parallel, and a DC to DC converter circuit coupled to the high voltage DC link capacitor circuit and the DC input. The AC to DC converter system comprises a plurality of switches, each switch configured to operate at a baseline duty cycle, a baseline voltage, a baseline resistance, with a baseline current and providing a baseline switching time. At least one switch is altered to perform at a duty cycle differing from the baseline duty cycle, a voltage differing from the baseline voltage, a resistance differing from baseline resistance, with a current differing from the baseline current or using a switching time differing from the baseline switching time.

These and other advantages of the present invention will become apparent to those skilled in the art from the following detailed description of the invention and the accompanying drawings.

BRIEF DESCRIPTION OF THE DRAWINGS

For a more complete understanding of the present disclosure, reference is now made to the following figures, wherein like reference numbers refer to similar items throughout the figures.

DETAILED DESCRIPTION

Figure 1:
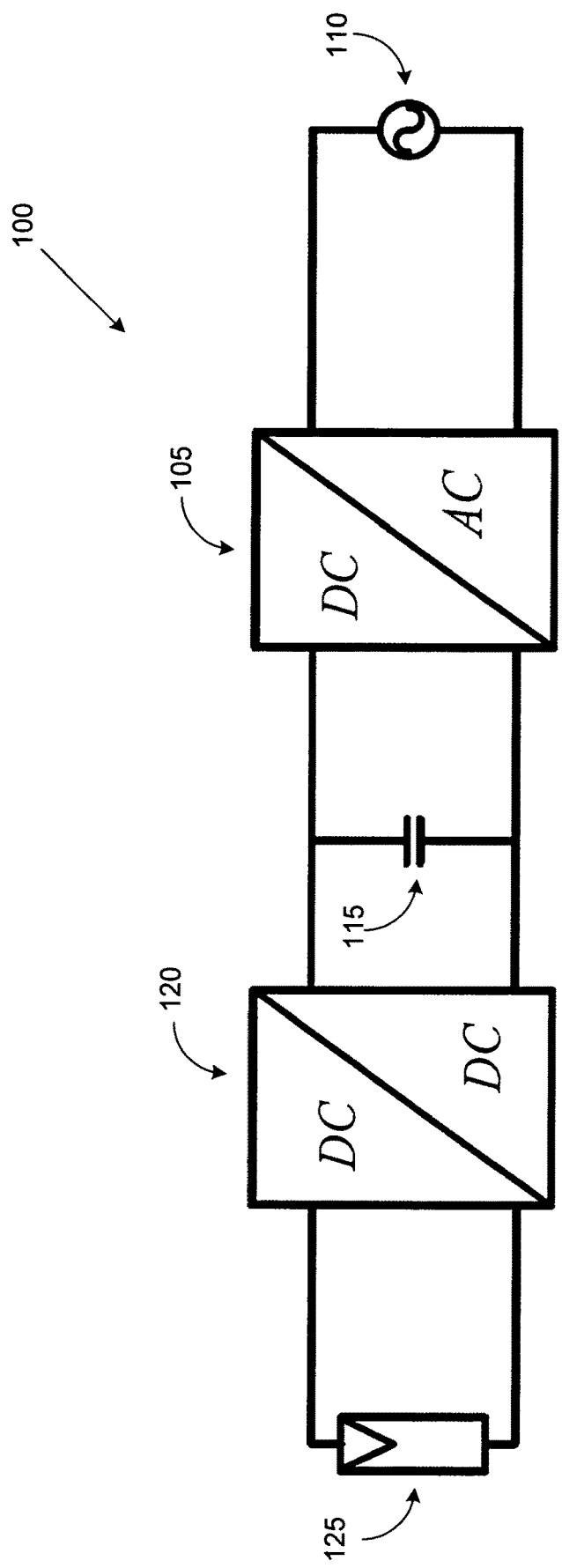
FIG. 1 is a general schematic representation of a conventional AC-DC converter.

The following description and the drawings illustrate specific embodiments sufficiently to enable those skilled in the art to practice the system and method described. Other embodiments may incorporate structural, logical, process and other changes. Examples merely typify possible variations. Individual elements and functions are generally optional unless explicitly required, and the sequence of operations may vary. Portions and features of some embodiments may be included in, or substituted for, those of others.

The present invention applies to electronic power converters with a high voltage intermediate DC link. Such a converter is typically, but not strictly, a multi-stage switching converter where the first stage converts either AC or DC power to an intermediate energy storage device, followed by a second converter that converts such energy to a different form of AC or DC. In these types of converters, the DC link is usually a bank of capacitors used to store or release energy as required. The DC link is also decoupled from either the input or output and can be independently regulated. There is a major advantage in making the DC link voltage as high as possible to reduce the amount of capacitance required. In conventional single phase AC 240V systems the link voltage is typically around 350V DC which is in the voltage range for electrolytic capacitors. Increasing the DC link voltage to 1000V will result in a 9 to 1 reduction in capacitance making it possible to use metalized film capacitors with substantially greater life. Disadvantages to this higher DC link voltage are increases in switching power losses and lower system efficiency. The present design involves methods and techniques for varying the DC link voltage or switching frequency, or in combination, to reduce AC losses and improve converter efficiency.

Thus according to one aspect of the present design, there is provided an electronic power converter comprising a multi-stage topology arrangement comprising a DC link decouple from the input and output, wherein the DC link may provide for a voltage independent from the converter's input and output and may operate at a significantly high voltage level. The present design's decoupling of the DC link may provide for power converter designs comprising metalized film capacitors, wherein the increased DC link operating voltage decreases the total capacitance required for storing energy. Use of metalized film capacitors self-healing and high reliability characteristics may significantly improve overall power converter design lifetimes in comparison to today's electrolytic device based designs.

According to another aspect of the present design, there is provided an electronic power converter comprising a multi-stage topology arrangement comprising a plurality power switches comprising wide band-gap semiconductor devices, for example silicon carbide (SiC) field effect transistors and diodes, wherein these devices exhibit high breakdown voltage, high switching frequency, and high operating temperature characteristics. Use of wide band-gap semiconductor devices in the present design may reduce circuit losses and thus increase overall power converter efficiency for designs operating at these higher voltages.

According to a further aspect of the present design, there is provided an electronic power converter comprising a multi-stage topology arrangement comprising a plurality power switches comprising of wide band-gap semiconductor devices, wherein these devices exhibit high breakdown voltage, high switching frequency, and high operating temperature characteristics, and further comprising a DC link decoupled from the input and output, wherein the DC link may provide for a voltage independent from the converter's input and output and may operate at a significantly higher voltage level. The increase in operating voltage yielded from the above disclosed arrangement may improve overall converter efficiency and increase the useful design lifetime.

Techniques and technologies may be described herein in terms of functional and/or logical block components and with reference to symbolic representations of operations, processing tasks, and functions that may be performed by various computing components or devices. For the sake of brevity, conventional techniques related to inverters, DC to DC converters, photovoltaic components and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

The following description refers to elements or nodes or features being "connected" or "coupled" together. As used herein, unless expressly stated otherwise, "connected" means that one element/node/feature is directly joined to (or directly communicates with) another element/node/feature, and not necessarily mechanically.

Likewise, unless expressly stated otherwise, "coupled" means that one element/node/feature is directly or indirectly joined to (or directly or indirectly communicates with) another element/node/feature, and not necessarily mechanically. Thus, although the schematic shown in FIG. 1 depicts one exemplary arrangement of elements, additional intervening elements, devices, features, or components may be present in an embodiment of the depicted subject matter. The description used herein is for an electronic power converter that represents an exemplary embodiment, but the not intended to be the only application of the invention. Indeed, this concept can be used in a wide variety of power conversion applications such as photovoltaic power conversion, electric vehicle charging, backup power, power line quality correction, and motor drives. The example of the photovoltaic converter is merely used as there is a particular demand for long lifetimes in that industry.

The present AC to DC converter system includes two power converters connected in series. In this series arrangement, the requirements for the DC link capacitor values are higher in order to realize single phase AC to DC power conversion, or rectification, when compared to DC to DC conversion, three-phase AC to DC rectification, and AC to AC, such as transformer, power conversion designs. In short, higher capacitance is required for Single Phase AC to DC power conversion.

FIG. 1 illustrates a conventional AC to DC converter system design involving two power converters connected in series. The first design stage is a boost converter 105 configured to provide for rectifying the AC line voltage received from grid 110 and configured to boost the received AC voltage to a fixed DC voltage at DC link capacitor 115. In one embodiment of the present design, the boost function may include a power factor correction arrangement or facility that insures the line currents remain in proportion to line voltage, such as in accordance with published industry standards. The next design stage is DC link capacitor 115 that provides the function of storing the energy needed to maintain and support the DC output when the AC grid input is near zero. The final stage is DC to DC converter 120 configured to provide output power regulation. In certain designs a high frequency transformer is included to provide galvanic isolation between grid 110 and Photovoltaic (PV) Generator 125 and also provide for shock hazard protection.

The energy stored in a capacitor is:

$$E = CV^2/2 \quad [1]$$

Solving equation [1] for the capacitance needed yields:

$$C = 2E/V^2 \quad [2]$$

Examining the relationships present in equation [2], the amount of capacitance required is proportional to the energy required and inversely proportional to the square of the applied voltage. This relationship allows for a decrease in the amount, or size, of DC link capacitors involved when increasing the voltage level.

The amount of DC Link Capacitance needed for a single phase AC-DC converter is:

$$C = P/(\omega grid * Vc * \Delta vc) \quad [3]$$

where C is DC link capacitance, P is Power, ωgrid is grid frequency, which is 2π*60 Hz, Vc is capacitor voltage, and Δvc is voltage ripple at five percent.

Figure 2:
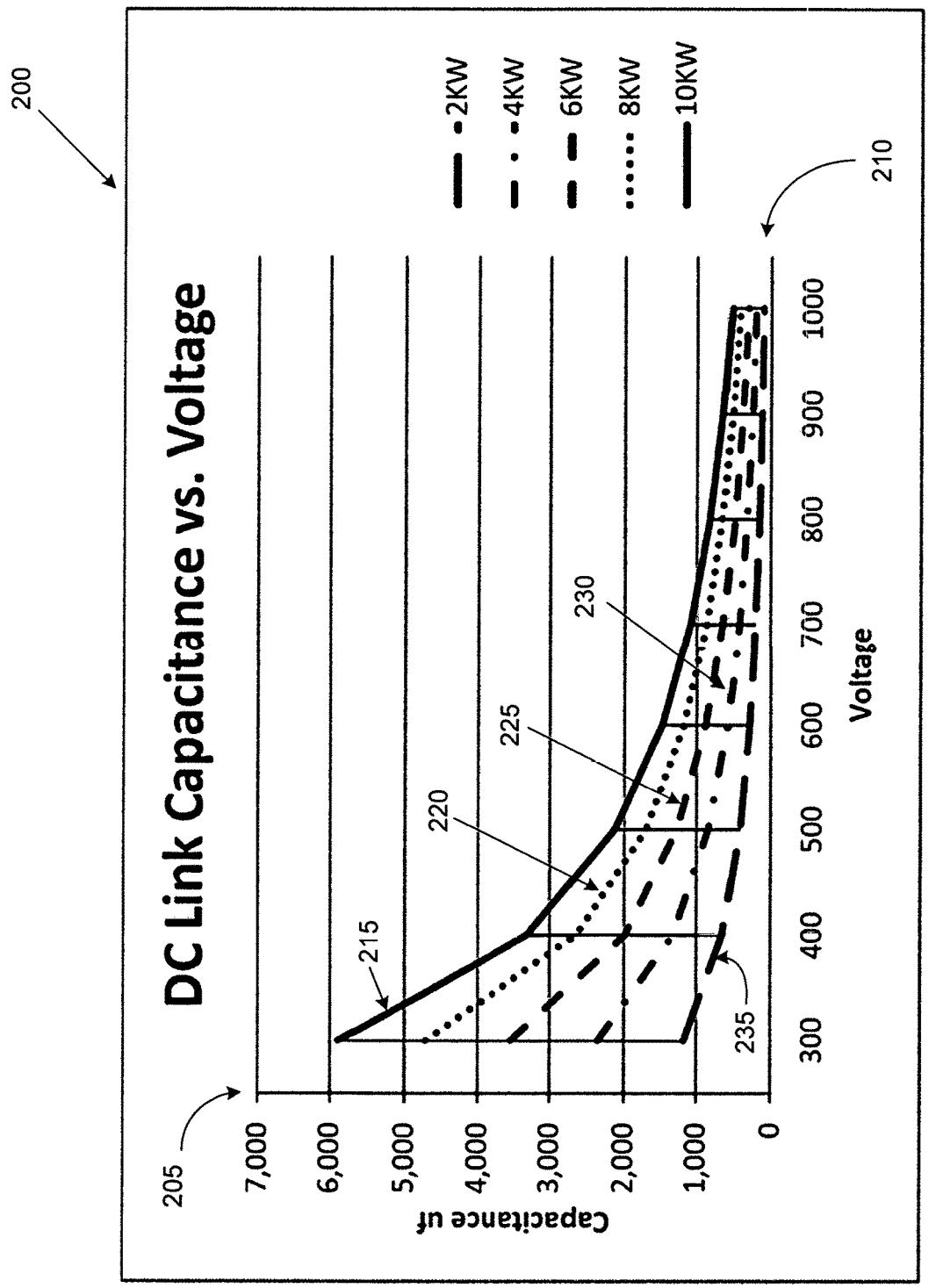
FIG. 2 illustrates the relationship between capacitance and voltage for various power levels in accordance with an aspect of the present design.

FIG. 2 illustrates the relationship between capacitance and voltage for various power levels. The curves are plotted for capacitance 205 on the vertical axis versus DC Link voltage 210 on the horizontal axis with curves for fixed power levels of 2 KW represented at legend point 235, 4 KW represented at legend point 230, 6 KW represented at legend point 225, 8 KW represented at legend point 220, and 10 KW represented at legend point 215. Examining the curves illustrated in FIG. 2, the capacitance values are shown to decrease exponentially with applied voltage and are found to dip below 1,000μf at voltages 750V and above regardless of power level. Further, operating at lower power levels may provide for lower DC ripple resulting from a more effective capacitance at a given power level.

Figure 3:
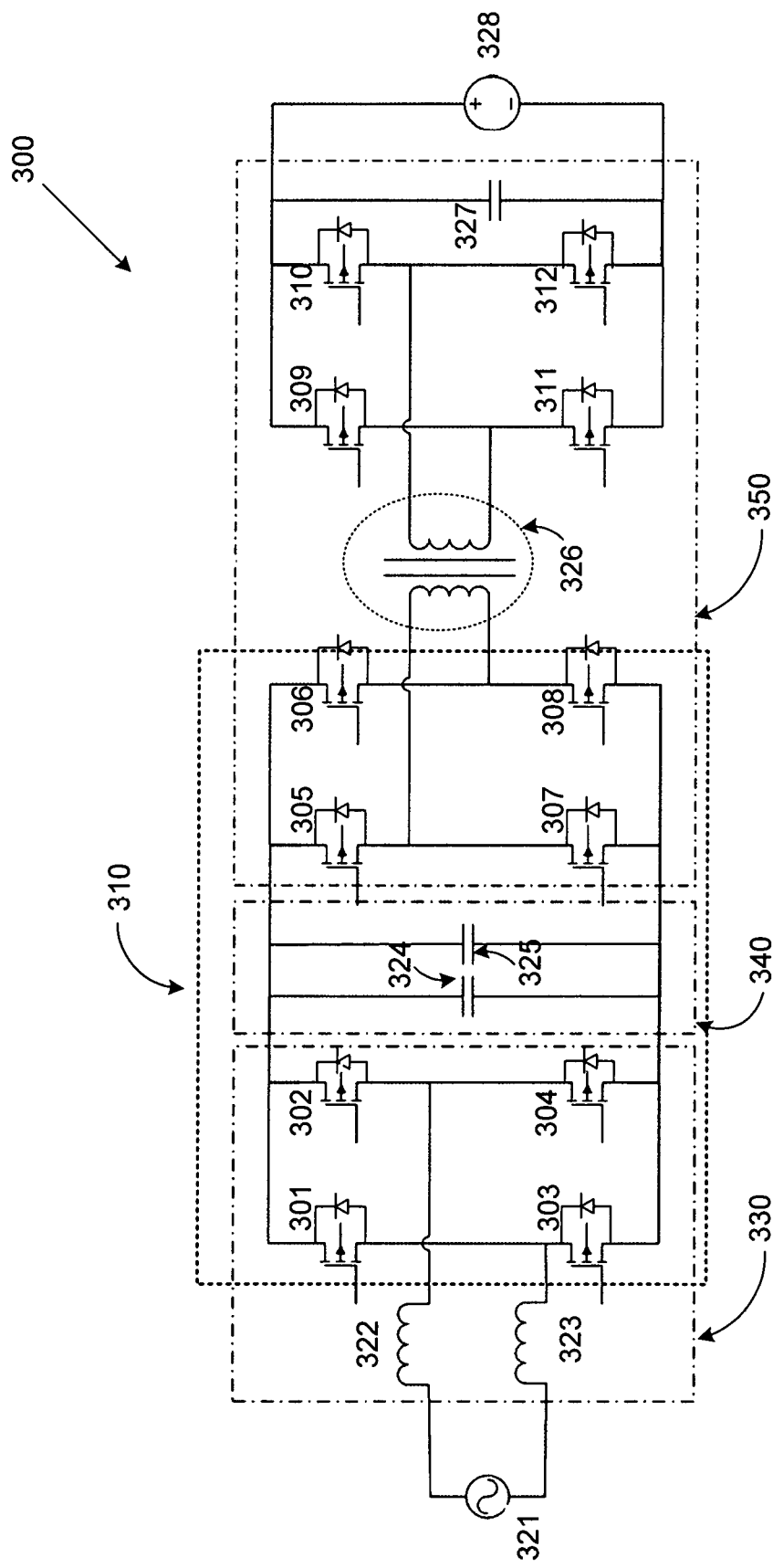
FIG. 3 is a schematic diagram for an improved high voltage AC-DC converter design in accordance with the present design.

FIG. 3 illustrates a simplified schematic for an improved High Voltage AC to DC power converter system 300 in accordance with an embodiment of the present design. The exemplary switching devices shown in FIG. 4, including switches 301-312, may comprise field effect transistors (FETs), e.g. SiC MOSFETs that have an internal freewheeling body diode. An external diode may be added in parallel with each MOSFET, such as a SiC Schottky Barrier Diode (SBD) having lower losses. An additional diode may be considered optional. Any other suitable device that may provide the same switching functionality as the foregoing devices may be employed. The present design's converter system 300 illustrated in FIG. 3 may include a full-bridge bi-directional circuit arrangement 320 as shown. Alternately, the design topology may be realized using half-bridge, unidirectional bridge, resonant, semi-resonant, and like switching arrangements.

Broken down, the left side of the diagram shows a single phase AC energy source 321 coupled to inductors 322 and 323 within AC-DC Boost Converter 330, which also includes switches 301, 302, 303, and 304. DC Link Capacitor section 340 includes capacitors 324 and 325, while isolated DC-DC Converter 350 includes switches 305-312, high frequency transformer 326, and capacitor 327. To the right is DC voltage source 328.

Figure 6:
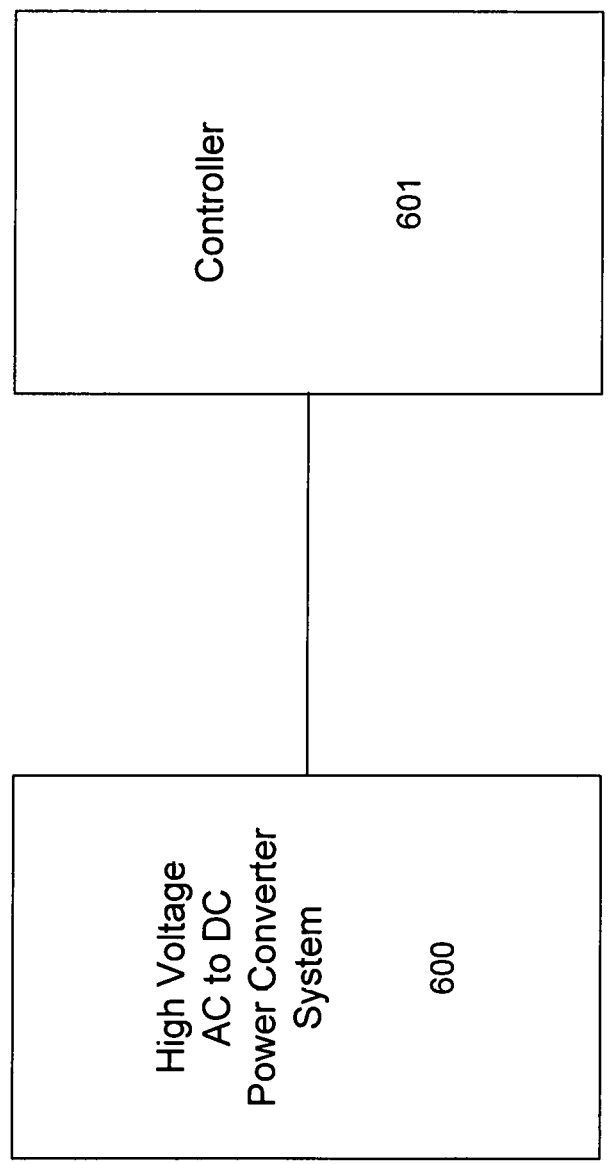
FIG. 6 illustrates the controller used with the system.

Not shown in FIG. 3 is a controller coupled to the High Voltage AC to DC power converter system 300, where the controller is configured to influence operation of the High Voltage AC to DC power converter system 300 to manage power transfer between single phase AC energy source 321 and DC voltage source 328 using switches 301-312. The controller 601 is presented in FIG. 6 and is coupled to High Voltage AC to DC power converter system 600.

The converter conceptually uses the same basic two stage topology of FIG. 1. However, DC link capacitors 324 and 325 operate at a much higher voltage than the capacitor of FIG. 1. A single capacitor may be employed but multiple capacitors in parallel can be provided if mechanical packaging dictates. The present design's operation at higher voltage may allow for a reduction in realized capacitance over current designs, such as the design illustrated in FIG. 1, and may facilitate the use of film capacitors.

In FIG. 3, each switch may be constructed from a MOSFET and diode. These semiconductors tend to be responsible for a relatively large power loss. Both suffer from two varieties of power loss: conduction and switching loss. The MOSFET and the diode act as switches that route current through the circuit during each switching interval. Conduction loss is generated in the on-resistance of the MOSFET ($R_{DS(ON)}$) and the forward voltage of the diode when each particular device is on.

MOSFET conduction loss ($P_{COND(MOSFET)}$) can be roughly approximated by the product of $R_{DS(ON)}$, duty cycle (D), and the average MOSFET current ($I_{MOSFET(AVG)}$) over the switch on-period.

The formula for calculating MOSFET conduction loss is:

$$P_{COND(MOSFET)}\text{(using average current)} = I_{MOSFET(AVG)}^2 \times R_{DS(ON)} \times D \quad [4]$$

Another power loss component is MOSFET and diode switching losses. Since time is required for transitions between MOSFET and diode on and off states, the circuit consumes power as these devices change state. Reduction of any of these components can result in a reduction of the conduction loss, where reduction of duty cycle is a reduction in circuit frequency.

Figure 4A:
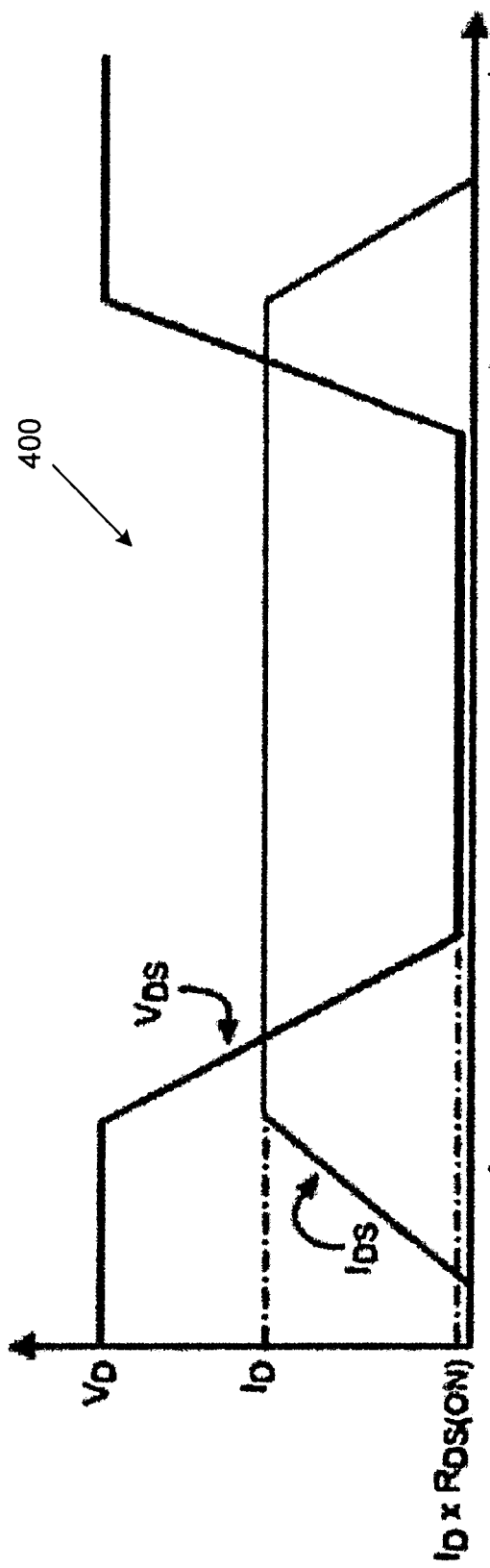
FIG. 4A is a simplified diagram depicting a plot of voltage and current versus time when switching a MOSFET device according to previous designs.

FIG. 4A is a plot 400 of voltage and current over time when switching a MOSFET device according to the previous designs. FIG. 4A shows voltage ($V_{DS}$) and drain-to-source current ($I_{DS}$) and the switching losses encountered during MOSFET transitions. Voltage and current transitions occur during $t_{SW(ON)}$ and $t_{SW(OFF)}$, representing periods of charging and discharging MOSFET capacitances. As indicated in FIG. 4A, full load current ($I_D$) transfers to the MOSFET before its $V_{DS}$ decreases to a final on-state value (equal to $I_D \times R_{DS(ON)}$). Conversely, the turn-off transition calls for $V_{DS}$ increasing to a final off-state value before current is transferred from the MOSFET.

Figure 4B:
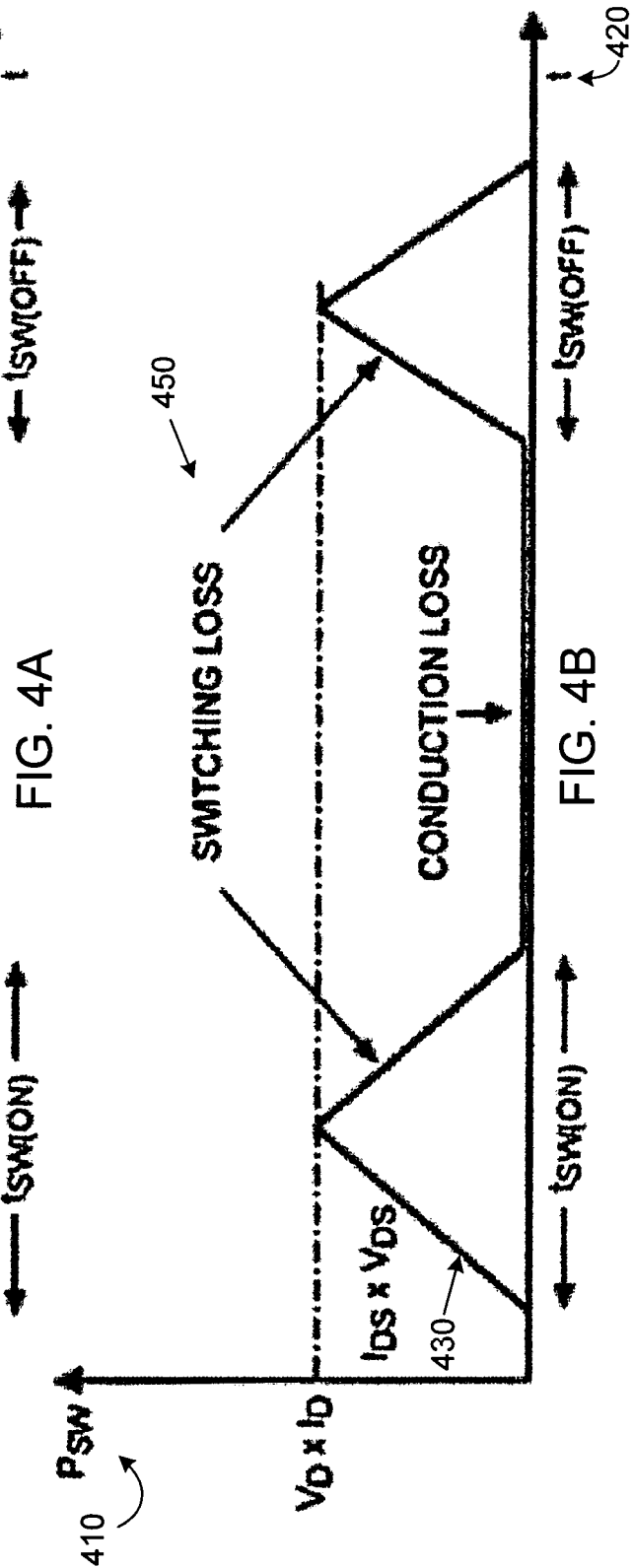
FIG. 4B is a simplified diagram depicting a plot of power versus time when switching a MOSFET device and the relevant switching and conduction losses.

FIG. 4B is the resultant graph 450, illustrating switching losses and conduction losses. FIG. 4B is a simplified power 410 versus time 420 plot of these transitions occur during $t_{SW(ON)}$ and $t_{SW(OFF)}$, with the result being voltage multiplied by current $I_{DS} \times V_{DS}$ 430 showing areas representing power dissipation switching losses and conduction loss.

Examining the loss components of the converter, the conduction loss is a function of the device parameters, either $R_{DS(ON)}$ for the MOSFET or VF for the diode. One way to reduce conduction loss is to decrease the switch current. Switching losses are a function of several parameters: $V_{DS}$, the DC link voltage, $I_{MOSFET(AVG)}$, the average MOSFET current, $t_{SW}$, the switch overlap time, and $F_{SW}$, the switching frequency.

The present design may use various state variables to reduce these overall power losses and improve circuit efficiency and performance.

The minimum amount of capacitance required to produce a certain specified voltage ripple, typically around five percent, is:

$$C = P/(\omega grid * Vc * \Delta vc) \quad [4]$$

where C is DC link capacitance, P is Power, ωgrid is grid frequency, which is 2π*60 Hz, Vc is capacitor voltage, and Δvc is voltage ripple in volts on the DC link, and may be a constant, e.g. five percent.

As Δvc is equal to R multiplied by Vc, Equation [4] may be rewritten as:

$$C = P/(\omega grid * Vc * R * Vc) \quad [5]$$

Solving the formula for voltage results in:

$$V_C = \sqrt{\frac{P}{C * \omega grid * R}} \quad [6]$$

where C, ωgrid, and R are constants.

Equation [6] yields the relationship for a fixed capacitance and ripple factor. The DC link voltage Vc is proportional to the square root of the power delivered. DC link voltage includes an upper boundary and a lower boundary. The lower boundary voltage is set at the minimum voltage required by the AC boost converter, which may be 350V DC for a 240V AC input. The upper voltage boundary, 1000V, is dictated by the breakdown voltage of either the capacitor or semiconductor switches including derating factors.

Figure 5:
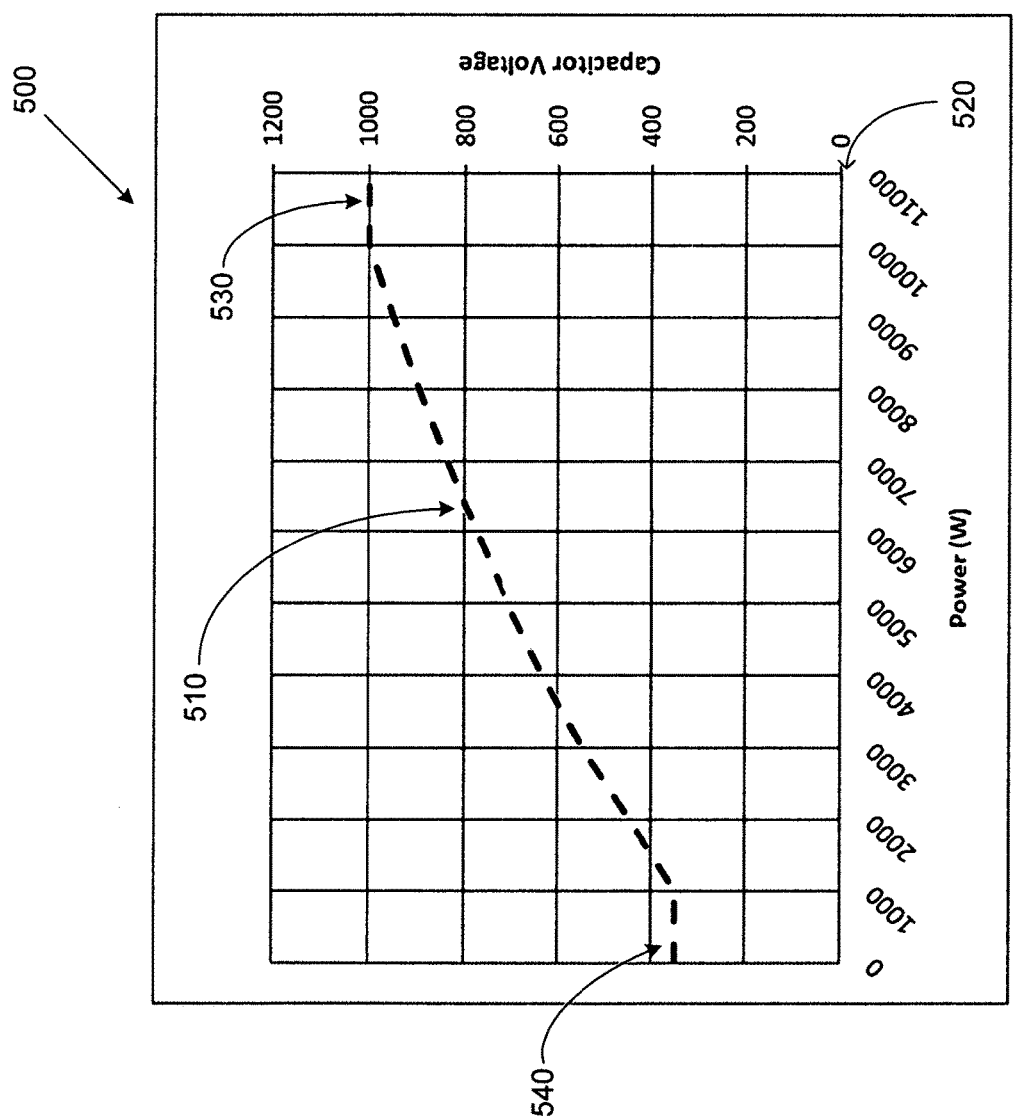
FIG. 5 is a graphical diagram illustrating DC link voltage as a function of power level in accordance with an embodiment of the present design.

FIG. 5 takes into account these boundary conditions, and presents a plot of DC Link voltage 510 versus output power 520 with upper boundary 530 and lower boundary 540 values for an exemplary 10 KW converter with 530 μf capacitance and five percent ripple. The shape of the curve may change based on various factors.

Switching loss increases as converter frequency is raised. The transition periods take a fixed amount of time, and hence a greater fraction of the total switching period as frequency increases and the switching period shrinks. A switching transition that requires only one-twentieth of the duty cycle will have less of an effect on efficiency than a switching transition that consumes one-tenth of the duty cycle. Due to its frequency dependence, switching loss dominates conduction losses at high frequencies.

Thus according to the present design, a multiple stage converter may be provided that isolates a capacitor or set of capacitors from the AC and DC sources. Using switches, such as is shown in FIG. 3, may provide for higher voltages and lower capacitance values, and in some instances film capacitors may be employed. According to the present implementation, to reduce power losses while switching in such an arrangement, the various components making up the conduction loss and switching loss in FIG. 4B may be altered, effectively reducing the values depicted therein toward zero. In the conduction loss situation, the present design may employ a relatively low current value while holding the voltage level at a relatively high level, i.e. reducing the $I_{MOSFET}$(AVG) value. Reduction in duty cycle may additionally reduce MOSFET conduction loss. On resistance of the MOSFET may be reduced to the extent it can be reduced while providing acceptable performance. With respect to switching losses, these depend on switching times ($t_{sw(oN)}$ and $t_{sw(oFF)}$) and reducing these switching times may be beneficial. Lowering of DC link voltage $V_{DS}$ may also be beneficial. Lowering the DC link voltage is beneficial at lower power levels since the capacitance is fixed and more effective at lower power levels to reduce voltage ripple. However, this may run contrary to the reduction in capacitance, and low voltage DC link voltage and low capacitance cannot be sustained in some implementations. Finally, overall converter frequency, i.e. frequency of the grid, may be reduced to reduce switching loss.

Further, in the design presented, each switch operates at a fixed frequency but the duty ratio or duty cycle (generally defined as the ratio of "on" time to "on plus off" time) is varied. Operation in this manner is sometimes called pulse width modulation or PWM. So in the current design, overall grid or operational frequency is fixed and the duty ratio or duty cycle, such as of switches, varies.

Thus according to one implementation, a baseline circuit may be provided that includes a number of switches operating at given duty cycles, voltages, resistances, switching times, and so forth, with a given current, and one or more of these values may be altered to provide lower switching losses and conduction losses. Such values may be altered by a controller (not shown) or by altering components in some manner, e.g. providing different MOSFETs and/or operating MOSFETS at different operating values.

One implementation of the AC to DC converter uses two conversion stages to decouple the DC link capacitors from the DC input. This allows increasing the DC link voltage which in turn reduces the amount of required capacitance for energy storage. The relationship between capacitance and voltage decreases exponentially. Reduced capacitance at a higher voltage permits using metalized film capacitors instead of aluminum electrolytic capacitors. Film capacitors have substantially longer lifetimes which will improve the reliability of the converter to meet industry demands. New semiconductor switches such as wide band-gap devices with higher breakdown voltages and lower switching losses are a good match for the higher DC link voltages. As a result, lifetime of an AC to DC converter may double.

Methods and techniques to reduce power losses in a high voltage DC Link converter are disclosed. The methodology can be applied in a wide variety of converters including DC-DC, AC-DC, AC-AC converters that are used in many power conversion applications such as photovoltaic solar inverters, motor drives, backup power and electric vehicle charging to name a few. In this disclosure a multi-stage topology is described where the DC link is decoupled from the input and output so that the voltage on the DC link can be independently established. Doing so permits a significant increase in voltage, typically 3 to 4 times over conventional converters, and an exponential decrease in the required capacitance. The increased DC link voltage will permit the use of metalized film capacitors instead of electrolytic capacitors. This type of capacitor is highly reliable since it has no liquid electrolyte and is self-healing. Predicted lifetimes are over twenty years at the design margins proposed. Another enabling technology is the use of wide band-gap semiconductors such as silicon carbide (SiC) field effect transistors and diodes. These devices have 10 times the breakdown voltage of silicon and higher operating temperatures. At higher operating voltages we can use 1200V SiC FETs instead of slow and lossy silicon IGBTs for the power switches and improve efficiency. When the DC link is set for a high voltage, switching losses will increase due to the higher voltage. This disclosure describes methods to reduce switching losses and improve efficiency in these types of converters.

Thus the present design includes a method to vary the DC link voltage in proportion to state variables such as power, voltage, or current to reduce AC switching losses in the converter, and a method to vary the switching frequency in proportion to state variables such as power, voltage, or current to reduce AC switching losses in the converter.

Thus according to one aspect of the current design, there is provided a multiple stage switching type converter circuit provided between an AC source and a DC source. The circuit comprises a boost converter stage coupled to the AC source, a DC link capacitor stage comprising a DC link capacitor decoupled from an AC source and a DC source, and an isolated DC-DC converter stage coupled to the DC source. The multiple stage switching type converter circuit comprises a plurality of switches, each switch configured to operate at a baseline duty cycle, a baseline voltage, a baseline resistance, with a baseline current and providing a baseline switching time. At least one switch is altered to perform at a duty cycle differing from the baseline duty cycle, a voltage differing from the baseline voltage, a resistance differing from baseline resistance, with a current differing from the baseline current or using a switching time differing from the baseline switching time.

According to another aspect of the present design, there is provided an AC to DC converter system, comprising a single phase AC energy source, a DC energy source, a bi-directional AC to DC boost converter circuit coupled to the single phase AC energy source, and a high voltage intermediate DC link circuit coupled to the bi-directional AC to DC Boost Converter and comprising at least one capacitor. The AC to DC converter system comprises a plurality of switches, each switch configured to operate at a baseline duty cycle, a baseline voltage, a baseline resistance, with a baseline current and providing a baseline switching time. At least one switch is altered to perform at a duty cycle differing from the baseline duty cycle, a voltage differing from the baseline voltage, a resistance differing from baseline resistance, with a current differing from the baseline current or using a switching time differing from the baseline switching time.

According to a further aspect of the present design, there is provided an AC to DC converter system comprising an AC input and a DC input, a bidirectional boost converter circuit coupled to the AC input, a high voltage DC link capacitor circuit coupled to the bidirectional boost converter and comprising multiple capacitors connected in parallel, and a DC to DC converter circuit coupled to the high voltage DC link capacitor circuit and the DC input. The AC to DC converter system comprises a plurality of switches, each switch configured to operate at a baseline duty cycle, a baseline voltage, a baseline resistance, with a baseline current and providing a baseline switching time. At least one switch is altered to perform at a duty cycle differing from the baseline duty cycle, a voltage differing from the baseline voltage, a resistance differing from baseline resistance, with a current differing from the baseline current or using a switching time differing from the baseline switching time.

The foregoing description of specific embodiments reveals the general nature of the disclosure sufficiently that others can, by applying current knowledge, readily modify and/or adapt the system and method for various applications without departing from the general concept. Therefore, such adaptations and modifications are within the meaning and range of equivalents of the disclosed embodiments. The phraseology or terminology employed herein is for the purpose of description and not of limitation.

What is claimed is:

1. A multiple stage switching type converter circuit provided between an AC source and a DC source, the multiple stage switching type converter circuit comprising: a boost converter stage coupled to the AC source; a DC link capacitor stage comprising exactly two DC link film capacitors connected in parallel, free of direct connections to resistors, and decoupled from the AC source and the DC source; an isolated DC-DC converter stage coupled to the DC source; and a controller configured to control a plurality of switches in the multiple stage switching type converter circuit to provide a variable DC link capacitor stage voltage with an output power up to 10 KW; wherein the variable DC link capacitor stage voltage is a nonzero constant value at output power values below 1 KW and varies linearly as a function of output power over a range between 1 KW and 10 KW.

2. The multiple stage switching type converter circuit of claim 1, wherein the controller is configured to influence operation of the multiple stage switching type converter circuit to manage one switch of the plurality of switches.

3. The multiple stage switching type converter circuit of claim 2, wherein the controller is further configured to control power transfer among the AC source and the DC source.

4. The multiple stage switching type converter circuit of claim 1, wherein the isolated DC to DC converter stage is coupled to the DC link capacitor stage.

5. The multiple stage switching type converter circuit of claim 4, wherein the isolated DC to DC converter stage comprises a high frequency transformer circuit.

6. The multiple stage switching type converter circuit of claim 1, wherein a second switch of the plurality of switches operates at a second baseline performance level.

7. The multiple stage switching type converter circuit of claim 1, wherein a second switch of the plurality of switches operates at a second baseline performance level and is controllable to operate at a lower switching or conduction loss at a different second operating baseline performance level.

8. The multiple stage switching type converter circuit of claim 1, wherein the plurality of switches comprises at least one field effect transistor.

9. An AC to DC converter system, comprising:
a single phase AC energy source;
a DC energy source;
a bi-directional AC to DC boost converter circuit coupled to the single phase AC energy source;

a high voltage intermediate DC link circuit coupled to the bi-directional AC to DC boost converter and comprising exactly two film capacitors, free of direct connections to resistors, connected in parallel; and a controller configured to control a plurality of switches in the AC to DC converter system to provide a high voltage intermediate DC link circuit voltage with an output power up to 10 KW, wherein the high voltage intermediate DC link circuit voltage is variable;

the high voltage intermediate DC link circuit voltage is a nonzero constant value at output power values below 1 KW and varies linearly as a function of output power over a range between 1 KW and 10 KW.

10. The AC to DC converter system of claim 9, wherein the controller is configured to influence operation of the AC to DC converter system to manage one switch of the plurality of switches.

11. The AC to DC converter system of claim 10, wherein the controller is further configured to control power transfer among the single phase AC energy source and the DC energy source.

12. The AC to DC converter system of claim 9, further comprising an isolated DC to DC converter stage, wherein the isolated DC to DC converter stage is coupled to the high voltage intermediate DC link circuit and the DC energy source.

13. The AC to DC converter system of claim 12, wherein the isolated DC to DC converter stage comprises a high frequency transformer circuit.

14. The AC to DC converter system of claim 9, wherein a second switch of the plurality of switches operates at a second baseline performance level.

15. The AC to DC converter system of claim 9, wherein a second switch of the plurality of switches operates at a second baseline performance level and is controllable to operate at a lower switching or conduction loss at a different second operating baseline performance level.

16. The AC to DC converter system of claim 9, wherein the plurality of switches comprises at least one field effect transistor.

17. An AC to DC converter system comprising:
an AC input and a DC voltage element;
a bidirectional boost converter circuit coupled to the AC input;
a high voltage DC link capacitor circuit coupled to the bidirectional boost converter and comprising exactly two film capacitors, free of direct connections to resistors, connected in parallel;
a DC to DC converter circuit coupled to the high voltage DC link capacitor circuit and the DC voltage element; and
a controller configured to control a plurality of switches in the AC to DC converter system to provide a high voltage DC link capacitor circuit voltage with an output power of up to 10 KW, wherein the high voltage DC link capacitor circuit voltage is variable;
wherein the high voltage DC link capacitor circuit voltage is a nonzero constant value at output power values below 1 KW and varies linearly as a function of output power over a range between 1 KW and 10 KW.

18. The AC to DC converter system of claim 17, wherein the controller is configured to influence operation of the AC to DC converter system to manage one switch of the plurality of switches.

19. The AC to DC converter system of claim 18, wherein the controller is further configured to control power transfer among the AC input and the DC voltage element.

20. The AC to DC converter system of claim 17, wherein the DC to DC converter circuit comprises a high frequency transformer circuit.

21. The AC to DC converter system of claim 17, wherein a second switch of the plurality of switches operates at a second baseline performance level and is controllable to operate at a lower switching or conduction loss at a different second operating baseline performance level.

22. The AC to DC converter system of claim 17, wherein the plurality of switches comprises at least one field effect transistor.

* * * * *